(12) United States Patent
Zhu et al.

(10) Patent No.: US 10,963,308 B2
(45) Date of Patent: Mar. 30, 2021

(54) METHOD FOR CONTROLLING FINGERPRINT PROCESSING RESOURCES, TERMINAL, AND COMPUTER-READABLE STORAGE MEDIUM

(71) Applicant: Guangdong Oppo Mobile Telecommunications Corp., Ltd., Guangdong (CN)

(72) Inventors: Kezhi Zhu, Guangdong (CN); Kui Jiang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 19 days.

(21) Appl. No.: 16/563,361

(22) Filed: Sep. 6, 2019

(65) Prior Publication Data
US 2019/0391848 A1    Dec. 26, 2019

Related U.S. Application Data

(63) Continuation of application No. PCT/CN2017/103524, filed on Sep. 26, 2017.

(30) Foreign Application Priority Data

Mar. 8, 2017 (CN) .......................... 201710136008.4

(51) Int. Cl.
*G06F 9/46* (2006.01)
*G06F 9/50* (2006.01)
(Continued)

(52) U.S. Cl.
CPC .......... *G06F 9/5033* (2013.01); *G06F 9/4881* (2013.01); *G06F 9/5022* (2013.01); *G06F 9/5038* (2013.01); *G06F 21/32* (2013.01)

(58) Field of Classification Search
None
See application file for complete search history.

(56) References Cited

U.S. PATENT DOCUMENTS

2013/0205057 A1    8/2013 Sasaoka

FOREIGN PATENT DOCUMENTS

| CN | 1945539 A | 4/2007 |
|---|---|---|
| CN | 103973690 A | 8/2014 |

(Continued)

OTHER PUBLICATIONS

Extended European Search Report for European Application No. 17900161.5 dated Feb. 11, 2020.

(Continued)

*Primary Examiner* — Gregory A Kessler (57) ABSTRACT

Provided are a method for controlling fingerprint processing resources, a terminal, and a computer readable storage medium. The method includes the following. A terminal adds, in a predetermined order, N access requests for the fingerprint processing resources initiated concurrently by N applications of the terminal to a predetermined access queue upon detecting the N access requests, where, in the predetermined access queue, an access request first added is first processed, and N is an integer greater than one. The terminal allocates the fingerprint processing resources to an application corresponding to an access request currently processed in the predetermined access queue, and updates the access request currently processed in the predetermined access queue according to a duration in which the application occupies the fingerprint processing resources.

20 Claims, 3 Drawing Sheets

(51) Int. Cl.
    *G06F 9/48* (2006.01)
    *G06F 21/32* (2013.01)

(56) References Cited

FOREIGN PATENT DOCUMENTS

| CN | 103973691 A | 8/2014 |
| CN | 105389203 A | 3/2016 |
| CN | 106406762 A | 2/2017 |

OTHER PUBLICATIONS

International search report issued in corresponding international application No. PCT/CN2017/103524 dated Dec. 28, 2017.

METHOD FOR CONTROLLING FINGERPRINT PROCESSING RESOURCES, TERMINAL, AND COMPUTER-READABLE STORAGE MEDIUM

CROSS-REFERENCE TO RELATED APPLICATION(S)

This application is a continuation of International Application No. PCT/CN2017/103524, filed on Sep. 26, 2017, which claims priority to Chinese Patent Application No. 201710136008.4, filed on Mar. 8, 2017, the disclosures of both of which are hereby incorporated by reference in their entireties.

TECHNICAL FIELD

This disclosure relates to the technical field of terminals, and more particularly to a method and a device for controlling fingerprint processing resources.

BACKGROUND

With wide popularity of smart phones, the smart phone can support an increasing number of applications and are becoming more powerful. The smart phone is also becoming diversified and personalized and has already been an indispensable electronic device in users' life.

For most terminals with the Android system, functions related to fingerprints are achieved based on fingerprint architecture of the Android M. The functions related to fingerprints include a fingerprint verification service which can be applied to multiple applications such as a lock screen application, a payment application (such as Alipay® and the like), a fingerprint registration application, or the like. During use of the fingerprint verification service, multiple applications may all need to use a fingerprint verification resource of the fingerprint verification service. If Application A and Application B access concurrently the fingerprint verification service, since the fingerprint verification service has only one fingerprint verification resource, allocation of the fingerprint verification resource will be in a mess. For example, when a fingerprint payment function of a payment application of the mobile phone is performing fingerprint verification, the mobile phone enters a lock screen state. In this situation, when a user attempts to unlock the mobile phone with a fingerprint, since the fingerprint verification resource is occupied by the payment application, the mobile phone will not be unlocked after the fingerprint is matched. Instead, the mobile phone will make payment through the payment application in the background, which affects operational stability and payment security of the mobile phone.

SUMMARY

In a first aspect of the present disclosure, a method for controlling fingerprint processing resources is provided. The method includes the following. N access requests for the fingerprint processing resources initiated concurrently by N applications of a terminal are added to a predetermined access queue in a predetermined order, upon detecting the N access requests, where, in the predetermined access queue, an access request first added is first processed, and N is an integer greater than one. The fingerprint processing resources are allocated to an application corresponding to an access request currently processed in the predetermined access queue. The access request currently processed in the predetermined access queue is updated according to a duration in which the application occupies the fingerprint processing resources.

In a second aspect of the present disclosure, a terminal is provided. The terminal includes at least one processor and a computer-readable storage. The computer-readable storage is coupled to the at least one processor and stores at least one computer executable instruction thereon which, when executed by the at least one processor, causes the at least one processor to carry out all or part of the operations described in the method of the first aspect of the present disclosure.

In a third aspect of the present disclosure, a non-transitory computer-readable storage medium is provided. The non-transitory computer-readable storage medium is configured to store a computer program which, when executed by a processor, causes the processor to carry out all or part of the operations described in the method of the first aspect of the present disclosure.

BRIEF DESCRIPTION OF THE DRAWINGS

The following will give a brief introduction to the accompanying drawings for describing implementations of the disclosure.

DETAILED DESCRIPTION

In order for those skilled in the art to better understand technical solutions of the present disclosure, in the following, technical solutions of implementations of the present disclosure will be described clearly and completely with reference to accompanying drawings in implementations of the present disclosure. Apparently, implementations described hereinafter are merely some implementations, rather than all implementations, of the present disclosure. All other implementations obtained by those of ordinary skill in the art based on implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A terminal in implementations of the disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the abovementioned devices are collectively referred to as the terminal. Hereinafter, implementations of the disclosure will be described in detail.

Figure 1:
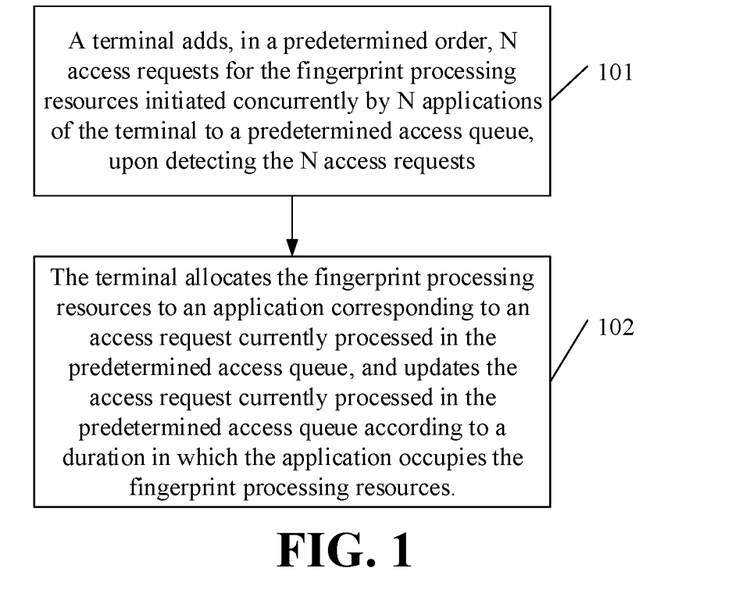
FIG. 1 is a schematic flowchart illustrating a method for controlling fingerprint processing resources according to an implementation of the present disclosure.

FIG. 1 is a schematic flowchart illustrating a method for controlling fingerprint processing resources according to an implementation of the present disclosure. As illustrated in FIG. 1, the method includes the following.

At block 101, a terminal adds, in a predetermined order, N access requests for the fingerprint processing resources initiated concurrently by N applications of the terminal to a predetermined access queue, upon detecting the N access requests, where, in the predetermined access queue, an access request first added is first processed, and N is an integer greater than one. Herein, the access request first added to the predetermined access queue can be processed earlier than an access request later added to the predetermined access queue.

In an implementation, the fingerprint processing resources include software resources and/or hardware resources for processing fingerprint data of a user. The fingerprint processing resources are used for, for example, payment, application download, identity verification, and unlocking.

At block 102, the terminal allocates the fingerprint processing resources to an application corresponding to an access request currently processed in the predetermined access queue, and updates the access request currently processed in the predetermined access queue according to a duration in which the application occupies the fingerprint processing resources.

In this implementation, the terminal adds, in the predetermined order, the N access requests for the fingerprint processing resources initiated concurrently by the N applications of the terminal to the predetermined access queue upon detecting the N access requests, where, in the predetermined access queue, the access request first added is first processed; allocates the fingerprint processing resources to the application corresponding to the access request currently processed in the predetermined access queue; updates the access request currently processed in the predetermined access queue according to the duration in which the application occupies the fingerprint processing resources. In this way, the terminal can process multiple access requests in the predetermined access queue by adding access requests initiated concurrently to the predetermined access queue and updating dynamically access requests in the predetermined access queue according to a duration in which each application occupies the fingerprint processing resources, which can avoid conflict of occupancy of the fingerprint processing resources caused by multiple access requests that are initiated concurrently and thus is beneficial to improving operational stability of a system.

In some scenarios, the N applications have different priorities, and thus the N applications can be distinguished by priority. The following describes how the N access requests are added to the predetermined access queue in the predetermined order in the case where the N applications have different priorities.

In an implementation, the N applications have different priorities, and the N access requests are added to the predetermined access queue in a descending order of the priorities of the N applications.

In this implementation, the terminal sorts access requests in an order of priorities of applications, to ensure that an access request of an application with a high priority is processed earlier. For example, a lock screen application has a priority higher than a payment application. In this case, when a first access request of the lock screen application and a second access request of the payment application are initiated concurrently, through a mechanism for adding access requests to the predetermined access queue illustrated in this implementation, the terminal can first allocate the fingerprint processing resources to the lock screen application for occupancy, to avoid making payment in the background through the payment application after successful fingerprint verification of a user due to occupancy of the fingerprint processing resources by the payment application when the terminal is in a lock screen state, which is beneficial to improving operational stability of system applications and payment security.

In some scenarios, the N applications have the same priority, which means that the N applications cannot be distinguished by priority. In this case, other information such as a chronological order of launching, usage frequencies of the N applications, or the like can be used. The following describes how the N access requests are added to the predetermined access queue in the predetermined order in the case where the N applications have the same priority.

In one implementation, the N applications have the same priority, and the N access requests are added to the predetermined access queue in a chronological order of launching of the N applications.

For instance, in the terminal, when a first access request of the payment application and a second access request of a chat application are initiated concurrently and launching of the payment application is earlier than that of the chat application, the terminal adds earlier the first access request and adds later the second access request to the predetermined access queue.

As can be seen, in this implementation, through a mechanism for adding access requests to the predetermined access queue, the terminal can make an application launched earlier by a user occupy earlier the fingerprint processing resources, which can make allocation of the fingerprint processing resources by the terminal more intelligent.

In the other implementation, the N applications have the same priority, and the N access requests are added to the predetermined access queue in a descending order of usage frequencies of the N applications.

In this implementation, through a mechanism for adding access requests to the predetermined access queue, the terminal can make an application with a high usage frequency occupy earlier the fingerprint processing resources, which can make allocation of the fingerprint processing resources by the terminal more intelligent.

In an implementation, the access request currently processed in the predetermined access queue is updated according to the duration in which the application occupies the fingerprint processing resources as follows. The access request currently processed in the predetermined access queue is updated to be an access request which is immediately after the access request currently processed, upon detecting that the duration in which the application occupies the fingerprint processing resources is shorter than or equal to a preset threshold.

In an implementation, before the access request currently processed in the predetermined access queue is updated to be the access request which is immediately after the access request currently processed, the access request currently processed in the predetermined access queue is deleted upon detecting that the duration in which the application occupies the fingerprint processing resources is shorter than or equal to the preset threshold.

It is to be noted that, the access request currently processed is not a fixed access request and changed dynamically as the procedure goes on. Upon detecting that the duration in which the application corresponding to the access request currently processed occupies the fingerprint processing resources is shorter than or equal to the preset threshold, the access request currently processed can be updated to the access request immediately after the access request currently processed. Alternatively, in order to further save memory space, upon detecting that the duration in which the application occupies the fingerprint processing resources is shorter than or equal to the preset threshold, the access request currently processed can be deleted and the new access request currently processed can turn to the access request immediately after the access request currently processed being deleted.

For example, in the terminal, a first access request of the lock screen application and a second access request of the payment application are initiated concurrently, the lock screen application has a priority higher than the payment application, and the preset threshold is 5 s (seconds). In this situation, the terminal adds earlier the first access request of the lock screen application and adds later the second access request of the payment application to the predetermined access queue according to priorities of the lock screen application and the payment application. Then the terminal allocates the fingerprint processing resources to the lock screen application corresponding to the access request currently processed (that is, the first access request). After the lock screen application completes a fingerprint unlock operation with the fingerprint processing resources, the lock screen application is notified to release the fingerprint processing resources. The terminal is notified that a duration in which the lock screen application occupies the fingerprint processing resources is 3 s. Upon detecting that 3 s is shorter than the preset threshold (that is, 5s), the terminal may or may not delete the first access request in the predetermined access queue and update the access request currently processed in the predetermined access queue to be the second access request.

In an implementation, the following is further conducted. An access request(s) unprocessed in the predetermined access queue is deleted, and an application corresponding to the access request unprocessed is notified of access failure, upon detecting that the duration in which the application occupies the fingerprint processing resources is longer than the preset threshold.

In this implementation, through a duration detection mechanism, the terminal controls applications subsequent to the application which occupies overtime the fingerprint processing resources to be unable to occupy the fingerprint processing resources, to avoid affecting system stability due to overtime occupancy of the fingerprint processing resources by multiple applications corresponding to multiple access requests initiated concurrently, which is beneficial to improving operational stability of system applications.

Figure 2:
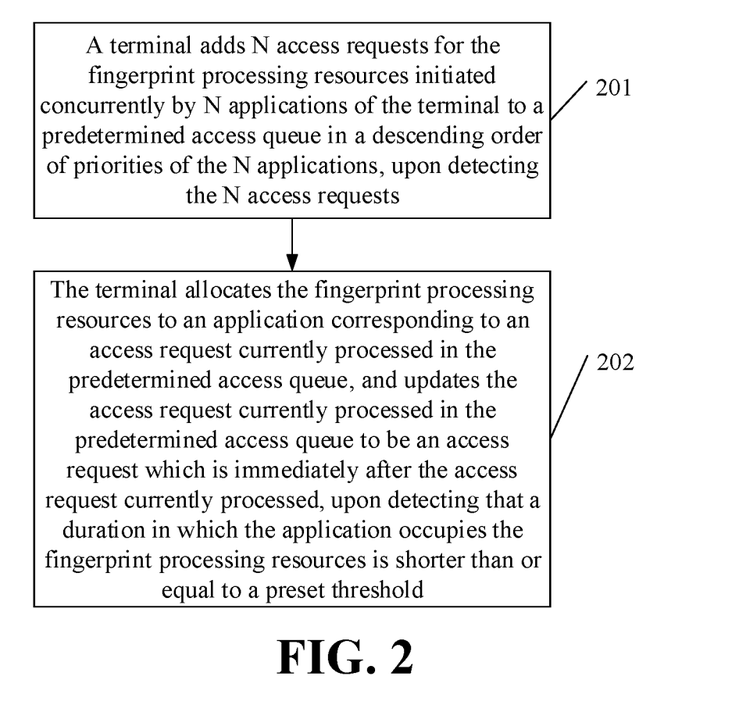
FIG. 2 is a schematic flowchart illustrating a method for controlling fingerprint processing resources according to another implementation of the present disclosure.

Similar to implementations illustrated in FIG. 1, FIG. 2 is a schematic flowchart illustrating a method for controlling fingerprint processing resources according to another implementation of the present disclosure. As illustrated in FIG. 2, the method includes the following.

At block 201, a terminal adds N access requests for the fingerprint processing resources initiated concurrently by N applications of the terminal to a predetermined access queue in a descending order of priorities of the N applications, upon detecting the N access requests, where, in the predetermined access queue, an access request first added is first processed, and N is an integer greater than one.

At block 202, the terminal allocates the fingerprint processing resources to an application corresponding to an access request currently processed in the predetermined access queue, and updates the access request currently processed in the predetermined access queue to be an access request which is immediately after the access request currently processed, upon detecting that a duration in which the application occupies the fingerprint processing resources is shorter than or equal to a preset threshold.

As can be seen, in this implementation, the terminal adds, in a predetermined order, the N access requests for the fingerprint processing resources initiated concurrently by the N applications of the terminal to the predetermined access queue, upon detecting the N access requests, where, in the predetermined access queue, the access request first added is first processed; allocates the fingerprint processing resources to the application corresponding to the access request currently processed in the predetermined access queue; updates the access request currently processed in the predetermined access queue according to the duration in which the application occupies the fingerprint processing resources. As such, the terminal can achieve processing of multiple access requests in the predetermined access queue by adding access requests initiated concurrently to the predetermined access queue and updating dynamically access requests in the predetermined access queue according to a duration in which each application occupies the fingerprint processing resources, which can avoid conflict of occupancy of the fingerprint processing resources caused by multiple access requests that are initiated concurrently and thus is beneficial to improving operational stability of a system.

In addition, the terminal sorts access requests in an order of priorities of applications, to ensure that an access request of an application with a high priority is processed earlier. For example, a lock screen application has a priority higher than a payment application. In this case, when a first access request of the lock screen application and a second access request of the payment application are initiated concurrently, through a mechanism for adding access requests to the predetermined access queue illustrated in this implementation, the terminal can first allocate the fingerprint processing resources to the lock screen application for occupancy, to avoid making payment in the background through the payment application after successful fingerprint verification of a user due to occupancy of the fingerprint processing resources by the payment application when the terminal is in a lock screen state, which is beneficial to improving operational stability of system applications and payment security.

Figure 3:
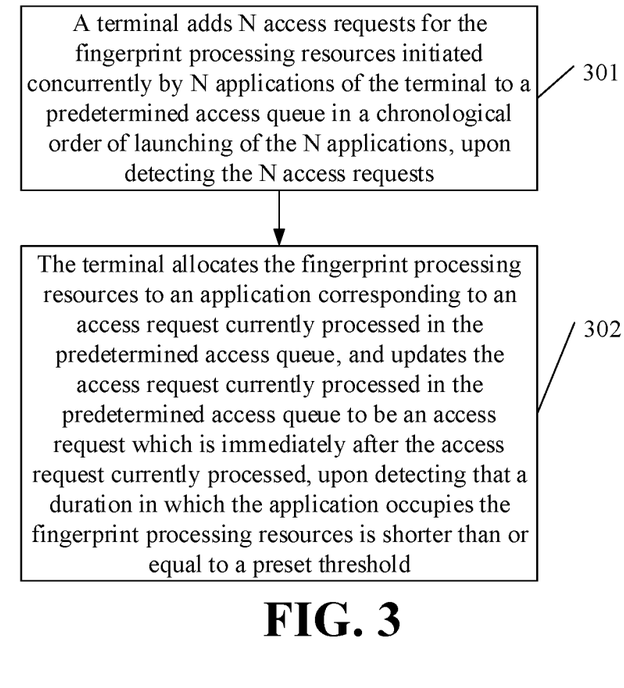
FIG. 3 is a schematic flowchart illustrating a method for controlling fingerprint processing resources according to another implementation of the present disclosure.

Similar to implementations illustrated in FIG. 1, FIG. 3 is a schematic flowchart illustrating a method for controlling fingerprint processing resources according to another implementation of the present disclosure. The method is applicable to a terminal with a fingerprint recognition area, and the fingerprint recognition area is provided with a physical key and a fingerprint sensor. As illustrated in FIG. 3, the method includes the following.

At block 301, a terminal adds N access requests for the fingerprint processing resources initiated concurrently by N applications of the terminal to a predetermined access queue in a chronological order of launching of the N applications, upon detecting the N access requests, where, in the predetermined access queue, an access request first added is first processed, and N is an integer greater than one.

At block 302, the terminal allocates the fingerprint processing resources to an application corresponding to an access request currently processed in the predetermined access queue, and updates the access request currently processed in the predetermined access queue to be an access request which is immediately after the access request currently processed, upon detecting that a duration in which the application occupies the fingerprint processing resources is shorter than or equal to a preset threshold.

As can be seen, in this implementation, the terminal adds, in a predetermined order, the N access requests for the fingerprint processing resources initiated concurrently by the N applications of the terminal to the predetermined access queue, upon detecting the N access requests, where, in the predetermined access queue, the access request first added is first processed; allocates the fingerprint processing resources to the application corresponding to the access request currently processed in the predetermined access queue; updates the access request currently processed in the predetermined access queue according to the duration in which the application occupies the fingerprint processing resources. As such, the terminal can process multiple access requests in the predetermined access queue by adding access requests initiated concurrently to the predetermined access queue and updating dynamically access requests in the predetermined access queue according to a duration in which each application occupies the fingerprint processing resources, which can avoid conflict of occupancy of the fingerprint processing resources due to multiple access requests initiated concurrently and thus is beneficial to improving operational stability of a system.

In addition, through a mechanism for adding access requests to the predetermined access queue, the terminal can make an application launched earlier by a user occupy earlier the fingerprint processing resources, which can make allocation of the fingerprint processing resources by the terminal more intelligent.

The foregoing technical solutions of implementations of the disclosure are mainly described from a perspective of execution of the method. It can be understood that, in order to implement the above functions, the terminal includes hardware structures and/or software modules for performing respective functions. Those of ordinary skill in the art will appreciate that units and algorithmic operations of various examples described in connection with implementations herein can be implemented in hardware or a combination of computer software and hardware. Whether these functions are implemented by means of hardware or computer software driving hardware depends on the particular application and the design constraints of the associated technical solution. For a specific application, those skilled in the art may use different methods to implement the described functionality, but such implementation should not be regarded as beyond the scope of the disclosure.

In implementations of the present disclosure, the terminal can be divided into different functional units according to the above method implementations. For example, the terminal can be divided into different functional units corresponding to each function, or two or more functions may be integrated into one processing unit. The integrated unit can take the form of hardware or a software functional unit. It is to be noted that, division of units provided herein is illustrative and is just a logical function division. In practice, there can be other manners of division.

Figure 4A:
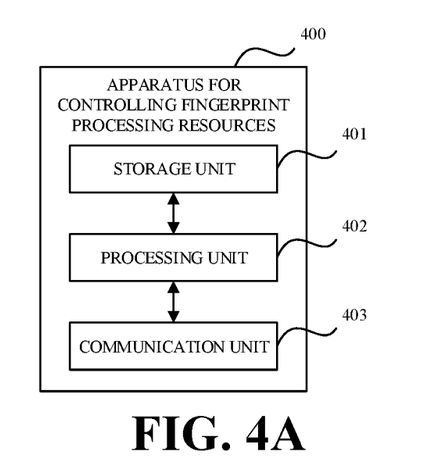
FIG. 4A is a schematic structural diagram illustrating an apparatus for controlling fingerprint processing resources according to an implementation of the present disclosure.

In an example, the integrated unit is adopted. FIG. 4A is a schematic structural diagram illustrating an apparatus for controlling fingerprint processing resources according to an implementation of the present disclosure. The apparatus 400 for controlling fingerprint processing resources includes a processing unit 402 and a communication unit 403. The processing unit 402 is configured to control and manage operations of the apparatus for controlling fingerprint processing resources. For example, the processing unit 402 is configured to be operable with the apparatus for controlling fingerprint processing resources to perform operations at block 101 and block 102 illustrated in FIG. 1, operations at block 201 and block 202 illustrated in FIG. 2, and operations at block 301 and block 302 illustrated in FIG. 3, and/or other operations of the technical solutions described in the present disclosure. The apparatus for controlling fingerprint processing resources further includes a storage unit 401 configured to store program codes and data of the apparatus for controlling fingerprint processing resources.

The processing unit 402 may be, a processor or a controller (for example, a central processing unit (CPU)), a general-purpose processor, a digital signal processor (DSP), an application-specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like. The communication unit 403 may be a communication interface, a transceiver, a transceiver circuit, or the like. The communication interface herein is a general term and can include one or more interfaces. The storage unit 401 may be a memory.

The processing unit 402 is configured to: add, in a predetermined order, N access requests for the fingerprint processing resources initiated concurrently by N applications of a terminal to a predetermined access queue, when the N access requests are detected, where, in the predetermined access queue, an access request first added is first processed, and N is an integer greater than one; allocate the fingerprint processing resources to an application corresponding to an access request currently processed in the predetermined access queue; update the access request currently processed in the predetermined access queue according to a duration in which the application occupies the fingerprint processing resources.

In an implementation, the N applications have different priorities. In terms of adding, in the predetermined order, the N access requests to the predetermined access queue, the processing unit is configured to: add the N access requests to the predetermined access queue in a descending order of the priorities of the N applications.

In an implementation, the N applications have the same priority. In terms of adding, in the predetermined order, the N access requests to the predetermined access queue, the processing unit is configured to: add the N access requests to the predetermined access queue in a chronological order of launching of the N applications.

In an implementation, the N applications have the same priority. In terms of adding, in the predetermined order, the N access requests to the predetermined access queue, the processing unit is configured to: add the N access requests to the predetermined access queue in a descending order of usage frequencies of the N applications.

In an implementation, in terms of updating the access request currently processed in the predetermined access queue according to the duration in which the application occupies the fingerprint processing resources, the processing unit is configured to: update the access request currently processed in the predetermined access queue to be an access request which is immediately after the access request currently processed, when the duration in which the application occupies the fingerprint processing resources is detected to be shorter than or equal to a preset threshold.

In an implementation, before the updating the processing unit is further configured to delete the access request currently processed in the predetermined access queue upon detecting that the duration in which the application occupies the fingerprint processing resources is shorter than or equal to the preset threshold.

Figure 4B:
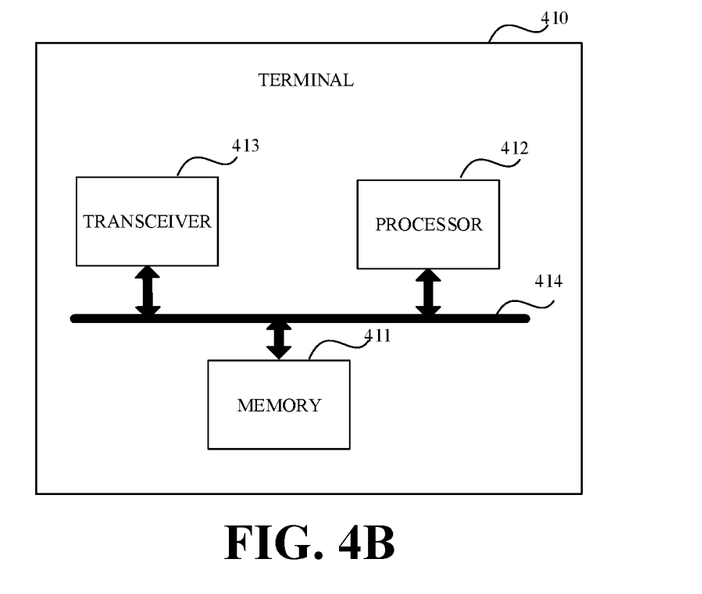
FIG. 4B is a schematic structural diagram illustrating a terminal according to an implementation of the present disclosure.

When the processing unit 402 is the processor, the communication unit 403 is the communication interface, and the storage unit 401 is the memory, the apparatus for controlling fingerprint processing resources provided herein can be a terminal illustrated in FIG. 4B.

As illustrated in FIG. 4B, the terminal 410 includes a processor 412, a transceiver 413, and a memory 411. The terminal 410 may further include a bus 414. The processor 412 is coupled with the transceiver 413 and the memory 411 via the bus 414. The bus 414 may be a peripheral component Interconnect (PCI) bus, an extended industry standard architecture (EISA) bus, or the like. The bus 414 can include an address bus, a data bus, a control bus, and the like. For convenience of illustration, the bus 414 is illustrated with only one bold line in FIG. 4B, which does not mean that there is only one bus or one type of bus.

The apparatus for controlling fingerprint processing resources illustrated in FIG. 4A can also be comprehended as an apparatus for a terminal, which is not limited herein.

Figure 5:
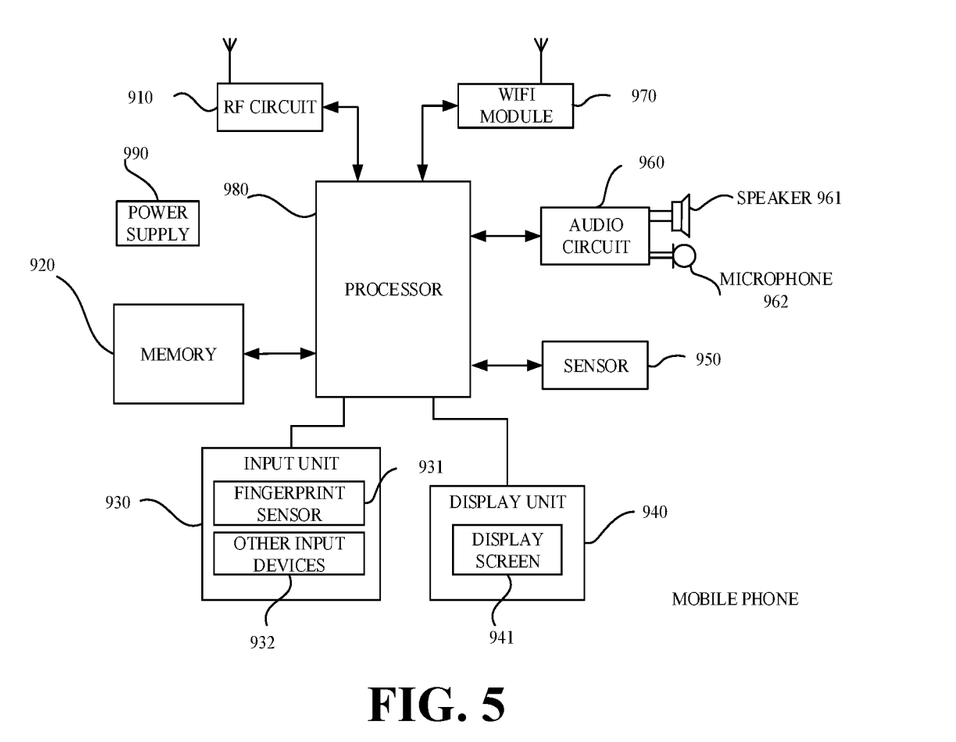
FIG. 5 is a schematic structural diagram illustrating a terminal according to another implementation of the present disclosure.

Implementations of the disclosure also provide another terminal. As illustrated in FIG. 5, only parts related to the implementations of the present disclosure are illustrated for ease of description. For technical details not described, reference may be made to the method implementations of the present disclosure. The terminal may be any terminal device, such as a mobile phone, a tablet computer, a personal digital assistant (PDA), a point of sale terminal (POS), an on-board computer and the like. The following describes the mobile phone as an example of the terminal.

FIG. 5 is a structural diagram illustrating parts of a mobile phone related to the terminal according to another implementation of the present disclosure. As illustrated in FIG. 5, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function, and so on. The data storage area may store data (such as usage parameters of an application) created according to use of the mobile phone, and so on. In addition, the memory 920 may include a high-speed RAM, and may further include a non-volatile memory such as at least one disk storage device, a flash memory device, or other non-volatile solid-state storage devices.

The input unit 930 may be configured to receive input digital or character information and generate key signal input associated with user setting and function control of the mobile phone. The input unit 930 may include a fingerprint sensor 931 and other input devices 932. The fingerprint sensor 931 can collect fingerprint data of the user. In addition to the fingerprint sensor 931, the input unit 930 may further include other input devices 932. The other input devices 932 may include, but are not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. The display screen 941 may be in the form of a liquid crystal display (LCD), an organic light-emitting diode (OLED), and so on. Although the fingerprint sensor 931 and the display screen 941 are illustrated as two separate components in FIG. 5 to realize the input and output functions of the mobile phone, in other examples, the fingerprint sensor 931 may be integrated with the display screen 941 to implement the input and output functions of the mobile phone.

The mobile phone may also include at least one sensor 950, such as a light sensor, a motion sensor, and other sensors. The light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify gestures of the mobile phone (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 for output. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 5, it can be understood that, the Wi-Fi module 970 is not essential to the mobile phone and can be omitted according to actual needs without departing from the essential nature of the present disclosure.

The processor 980 is the control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. The processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 to FIG. 3 can be realized based on the structure of the mobile phone.

The functions of the units illustrated in FIG. 4A can be achieved based on the structure of the mobile phone.

Implementations of the present disclosure also provide a non-transitory computer-readable storage medium. The non-transitory computer-readable storage medium is configured to store programs which, when executed, are operable with a computer to execute all or part of the operations of any of the methods for controlling fingerprint processing resources described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for controlling fingerprint processing resources, comprising:
   adding, in a predetermined order, N access requests for the fingerprint processing resources initiated concurrently by N applications of a terminal to a predetermined access queue, upon detecting the N access requests, wherein, in the predetermined access queue, an access request first added is first processed, and N is an integer greater than one;
   allocating the fingerprint processing resources to an application corresponding to an access request currently processed in the predetermined access queue; and
   updating the access request currently processed in the predetermined access queue according to a duration in which the application occupies the fingerprint processing resources.

2. The method of claim 1, wherein the N applications have different priorities, and adding, in the predetermined order, the N access requests to the predetermined access queue comprises:
   adding the N access requests to the predetermined access queue in a descending order of the priorities of the N applications.

3. The method of claim 1, wherein the N applications have a same priority, and adding, in the predetermined order, the N access requests to the predetermined access queue comprises:
   adding the N access requests to the predetermined access queue in a chronological order of launching of the N applications.

4. The method of claim 1, wherein the N applications have a same priority, and adding, in the predetermined order, the N access requests to the predetermined access queue comprises:
   adding the N access requests to the predetermined access queue in a descending order of usage frequencies of the N applications.

5. The method of claim 1, wherein updating the access request currently processed in the predetermined access queue according to the duration in which the application occupies the fingerprint processing resources comprises:
   updating the access request currently processed in the predetermined access queue to be an access request which is immediately after the access request currently processed, upon detecting that the duration in which the application occupies the fingerprint processing resources is shorter than or equal to a preset threshold.

6. The method of claim 5, further comprising:
   before updating the access request currently processed in the predetermined access queue, deleting the access request currently processed in the predetermined access queue upon detecting that the duration in which the application occupies the fingerprint processing resources is shorter than or equal to the preset threshold.

7. The method of claim 1, further comprising:
   deleting an access request unprocessed in the predetermined access queue, and notifying an application corresponding to the access request unprocessed of access failure, upon detecting that the duration in which the application occupies the fingerprint processing resources is longer than a preset threshold.

8. The method of claim 1, wherein the N applications comprise a lock screen application and a payment application and the lock screen application has a priority higher than the payment application, and the method further comprises:
   notifying the lock screen application to release the fingerprint processing resources, after detecting that the lock screen application completes a fingerprint unlock operation with the fingerprint processing resources.

9. The method of claim 1, wherein the fingerprint processing resources comprise at least one of software resources and hardware resources for processing fingerprint data of a user.

10. The method of claim 9, wherein the fingerprint processing resources are used for at least one of: payment, application download, identity verification, and unlocking.

11. A terminal, comprising:
    at least one processor; and
    a computer-readable storage, coupled to the at least one processor and storing at least one computer executable instruction thereon which, when executed by the at least one processor, causes the at least one processor to carry out actions, comprising:
       adding, in a predetermined order, N access requests for fingerprint processing resources initiated concurrently by N applications of a terminal to a predetermined access queue, upon detecting the N access requests, wherein, in the predetermined access queue, an access request first added is first processed, and N is an integer greater than one;
       allocating the fingerprint processing resources to an application corresponding to an access request currently processed in the predetermined access queue; and
       updating the access request currently processed in the predetermined access queue according to a duration in which the application occupies the fingerprint processing resources.

12. The terminal of claim 11, wherein the N applications have different priorities, and the at least one processor configured to carry out adding, in the predetermined order, the N access requests to the predetermined access queue is configured to carry out actions, comprising:
    adding the N access requests to the predetermined access queue in a descending order of the priorities of the N applications.

13. The terminal of claim 11, wherein the N applications have a same priority, and the at least one processor configured to carry out adding, in the predetermined order, the N access requests to the predetermined access queue is configured to carry out actions, comprising:
    adding the N access requests to the predetermined access queue in a chronological order of launching of the N applications.

14. The terminal of claim 11, wherein the N applications have a same priority, and the at least one processor configured to carry out adding, in the predetermined order, the N access requests to the predetermined access queue is configured to carry out actions, comprising:

adding the N access requests to the predetermined access queue in a descending order of usage frequencies of the N applications.

15. The terminal of claim 11, wherein the at least one processor configured to carry out updating the access request currently processed in the predetermined access queue is configured to carry out actions, comprising:

updating the access request currently processed in the predetermined access queue to be an access request which is immediately after the access request currently processed, upon detecting that the duration in which the application occupies the fingerprint processing resources is shorter than or equal to a preset threshold.

16. The terminal of claim 15, wherein the at least one processor is further configured to carry out actions, comprising:

before updating the access request currently processed in the predetermined access queue, deleting the access request currently processed in the predetermined access queue upon detecting that the duration in which the application occupies the fingerprint processing resources is shorter than or equal to the preset threshold.

17. The terminal of claim 11, wherein the at least one processor is further configured to carry out actions, comprising:

deleting an access request unprocessed in the predetermined access queue, and notifying an application corresponding to the access request unprocessed of access failure, upon detecting that the duration in which the application occupies the fingerprint processing resources is longer than a preset threshold.

18. The terminal of claim 11, wherein the N applications comprise a lock screen application and a payment application and the lock screen application has a priority higher than the payment application, and the at least one processor is further configured to carry out actions, comprising:

notifying the lock screen application to release the fingerprint processing resources, after detecting that the lock screen application completes a fingerprint unlock operation with the fingerprint processing resources.

19. The terminal of claim 11, wherein the fingerprint processing resources comprise at least one of software resources and hardware resources for processing fingerprint data of a user.

20. A non-transitory computer-readable storage medium, storing a computer program which, when executed by a processor, causes the processor to carry out actions, comprising:

adding, in a predetermined order, N access requests for fingerprint processing resources initiated concurrently by N applications of a terminal to a predetermined access queue, upon detecting the N access requests, wherein, in the predetermined access queue, an access request first added is first processed, and N is an integer greater than one;

allocating the fingerprint processing resources to an application corresponding to an access request currently processed in the predetermined access queue; and updating the access request currently processed in the predetermined access queue according to a duration in which the application occupies the fingerprint processing resources.

* * * * *